(No Model.)  7 Sheets—Sheet 2.

F. H. RICHARDS.
TURNING MACHINE.

No. 497,286.  Patented May 9, 1893.

Inventor:
F. H. Richards

Witnesses:
H. Mahner
Henry L. Peckard (No Model.) 7 Sheets—Sheet 3.

F. H. RICHARDS.
TURNING MACHINE.

No. 497,286. Patented May 9, 1893.

Witnesses:
H. Mallnor
Henry L. Rickard.

Inventor:
F. H. Richards (No Model.)

F. H. RICHARDS.
TURNING MACHINE.

No. 497,286.    Patented May 9, 1893.

Witnesses:
H. Mallner.
Henry L. Reckard.

Inventor:
F. H. Richards (No Model.) 7 Sheets—Sheet 5.

F. H. RICHARDS.
TURNING MACHINE.

No. 497,286. Patented May 9, 1893.

Witnesses:
H. Mallner.
Henry L. Reckard.

Inventor:
F. H. Richards (No Model.)  7 Sheets—Sheet 6.

F. H. RICHARDS.
TURNING MACHINE.

No. 497,286.  Patented May 9, 1893.

Witnesses:
H. Mallner.
Henry L. Reckard.

Inventor:
F. H. Richards

(No Model.) 7 Sheets—Sheet 7.

F. H. RICHARDS.
TURNING MACHINE.

No. 497,286. Patented May 9, 1893.

Witnesses:
H. Mallner.
Henry L. Reckard.

Inventor:
F. H. Richards.

UNITED STATES PATENT OFFICE.

FRANCIS H. RICHARDS, OF HARTFORD, ASSIGNOR TO THE PARKER & WHIPPLE COMPANY, OF MERIDEN, CONNECTICUT.

TURNING-MACHINE.

SPECIFICATION forming part of Letters Patent No. 497,286, dated May 9, 1893.

Application filed February 15, 1892. Serial No. 421,522. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Turning-Machines, of which the following is a specification.

This invention relates to that class of turning machines, or lathes, which are usually provided with a series of cutting tools adapted to be brought successively into use. The object is to furnish a multi-tool turning machine, or lathe, having feed mechanism adapted to be actuated both by hand and by power, and especially adapted for accurately turning the small parts of machines, such, for instance, as the shafts and spindles of clocks.

In the drawings accompanying and forming a part of this specification.

Similar characters designate like parts in all the figures.

The framework of my improved turning machine, in the preferred form thereof shown in the drawings, consists of a base, or bottom-plate, furnished with suitable supports and bearings for carrying the spindles, shafts, and other operative parts of the mechanism.

The framework is designated in a general way by B, and the base, or bottom-plate, thereof is designated by 70. At the forward side and left-hand end of the framework, there rises from the bed-plate the head-block for the live-spindle, or "lathe-spindle," of the machine; which block has the forward upright 72 and the rearward upright 73, for the spindle-bearings 91 and 95, respectively. For holding said bearings, or boxes, in place, said uprights are provided with the usual caps 92 and 96, respectively, these caps being held in place by the usual cap-screws, 93 and 97, respectively. The head-block being elevated from the level of the bed-plate 70, and formed hollow, as will be understood by comparison of Figs. 3 and 12, there is provided within said block a space convenient for receiving certain details of the lathe mechanism which are hereinafter described. Access to the said head-block space is had through the opening in the plate 70, of the full size of said space. The upper plate of said block is designated by 71, and the head-block may be formed integral with the framework, as indicated in the drawings of this application, or, it may consist of a separate piece (not herein shown) fixed to the base of the framework after the manner of an ordinary lathe-head.

Figure 4:
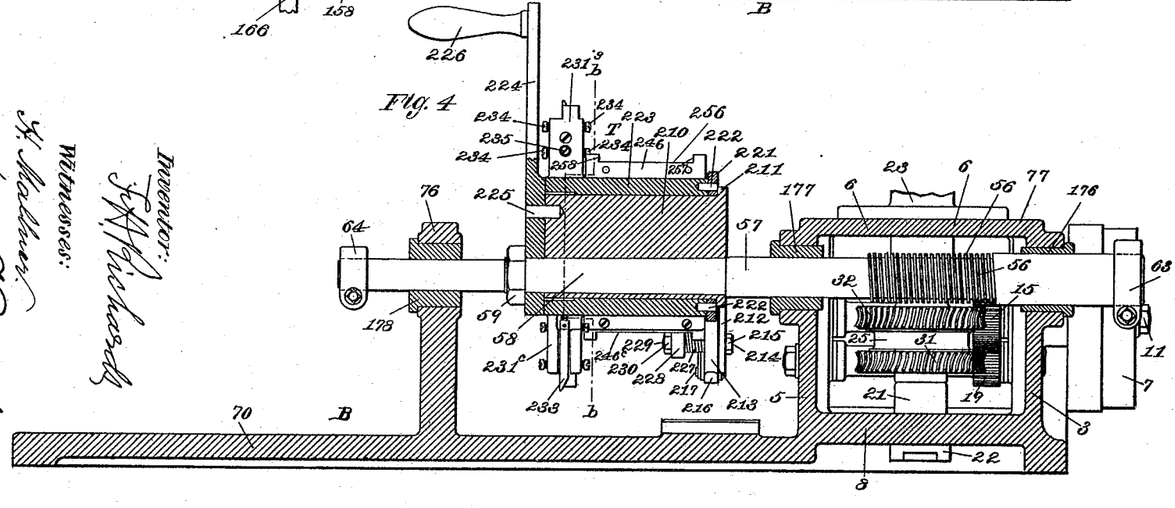
Fig. 4 is a vertical longitudinal section in the plane of the turret-carrying shaft.
Figure 5:
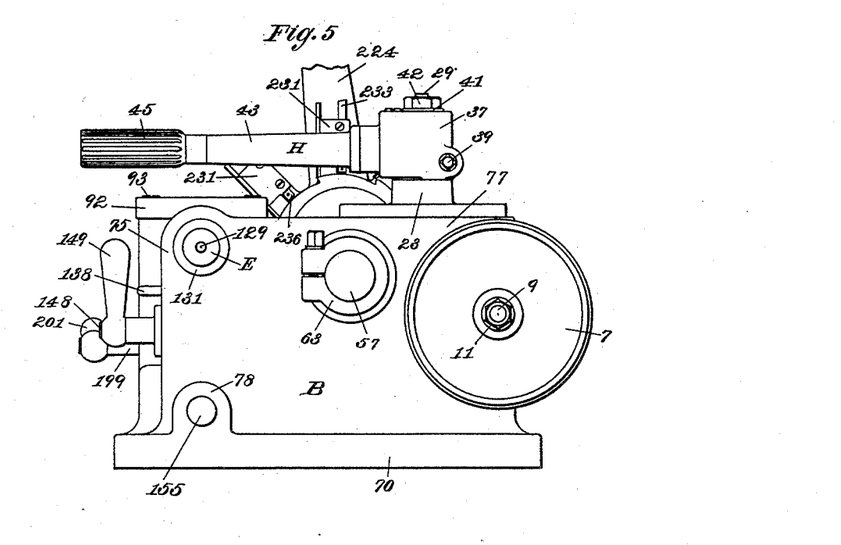
Fig. 5 is an end elevation of the machine, as seen from the right-hand in the preceding figures.

For carrying the dead-spindle of the lathe, the framework is provided with the forward and rearward bearings 74 and 75, which connect integrally with the box-portion, 77, of the frame; in which box-portion the feed mechanism is assembled. From the aforesaid upright 72 the bearing 76 extends backwardly to carry the left-hand end of the turret-shaft; the right-hand end of said shaft is carried by two bearings in said box-portion 77, as shown at 176 and 177, respectively. See Figs. 1 and 4. Underneath the framework, within the space which extends under the head-blocks, there is a bearing, 80, for supporting the middle portion of a cam-shaft hereinafter described.

The lathe-spindle, which is designated in a general way by S and is usually denominated "the live-spindle," is a hollow spindle journaled in the two-part spindle-bearings 91 and 95, that are carried, as hereinbefore described and as will be understood from the drawings, by the uprights 72 and 73, respectively. The forward box 91 is of the ordinary description, the two parts thereof being fitted, the one above the other, between the jaws of the upright 72, and held in place by the cap 92. The rearward spindle-bearing 95 is similarly formed of two parts, fitted the one above the other, between the jaws of the upright 73 and held in place by the cap 96.

Figure 3:
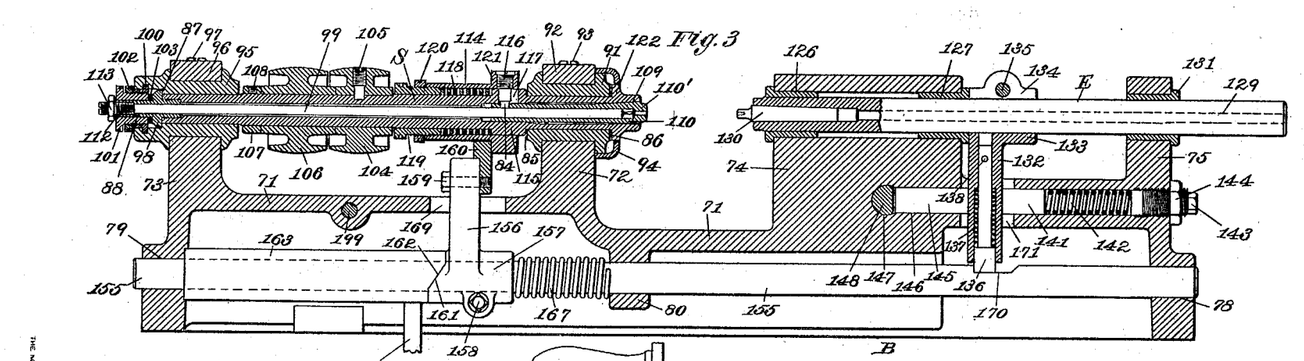
Fig. 3 is a longitudinal vertical section through the axes of the lathe-spindles, some of the parts of the machine located back of said spindles being omitted.

The spindle S is shown furnished with the step 98, firmly screwed into the rearward end thereof and having a tubular extension, 88, reaching rearwardly therefrom and internally bored to receive the stop-rod 99 that is screwed into said tubular extension, being held in place by the check-nut 113, as shown in Fig. 3. A ring, or nut, 100, is removably fixed in the bearing 95, in the well-known manner illustrated in Fig. 3, and is internally threaded to receive the hollow step-screw 101, which has a head whereby to turn the same, and is furnished with the check-nut 102 for holding it in place. The aforesaid tubular extension, 88, of the spindle-step should extend entirely through said step-screw 101, so as to bring the threaded end 112 of said stop-rod, and said check-nut 113, into position for convenient adjustment of that rod. The flange of the spindle-step 98 bears against a shoulder at 87 in the bearing 95; while its rearward side bears against the loose washer 103 usually placed between said step-flange and the bearing-point of said step-screw.

By means of the step construction herein described, the longitudinal position of the spindle in its bearings is governed entirely by said step-flange; so that the expansion of the spindle due to variations in temperature during the operation of the machine carries the right-hand end of the spindle more or less toward the right-hand, as the case may be; and the rod 99, being also held at the left-hand end thereof in the step of the spindle, is unaffected by the changes of length in the spindle itself. By this means the pieces to be turned are kept at an adjustably-fixed point in the machine, notwithstanding the well-known described changes in the length of the spindle itself, and independently of the closing movement of the chuck.

For the purpose of permitting the spindle-expansion described, a slight space is made at 86 between the forward bearing 91 and the flange 122 of the spindle S. For preventing the access of dirt to said space and through this into the spindle bearing, a dust-guard, 94, is fitted upon the forward end of the bearing 91, and fits closely yet freely over said spindle-flange, as will be understood from Fig. 3. For similar reasons, a slight space is made at 85 between the spindle-bearing 91 and the enlarged portion, 115, of the spindle S.

For the purpose of driving the spindle S and for starting and stopping said spindle, this is shown provided with the fixed pulley 104 secured thereto by means of a suitable set-screw, as 105; and with the loose pulley 106 held in place on the spindle by the collar 107 and set-screw 108. At the forward end of the live spindle, the bore thereof is enlarged and tapered for a short distance, as at 109, Fig. 3, to receive the tapered split working end, 110', of the chuck 110. This chuck, which as shown is of the usual "spring" variety, is split for a considerable portion of its length to permit its working end to be closed onto the piece of work when the chuck is drawn into the bore of the spindle. This operation is effected by means of a sliding sleeve, 114, whose enlarged forward end, or collar, 121, carries a pin or screw, 116, whose point 84 fits closely in a hole in one side of said chuck 110, as shown in Fig. 3; said pin or screw-point extending through the slot 117 in the enlarged portion 115 of the spindle. For retracting said sliding clutch-actuating sleeve, a spiral push-spring, 118, is placed upon the spindle immediately back of the enlarged portion 115 thereof; this spring acts against the adjusting-screw 119 which is screwed into the left-hand end of said sliding sleeve, being adjustably fixed therein by means of the check-nut 120. The hollow spring-adjusting screw 119 serves as a bearing for the left-hand end of the sliding sleeve. The chuck is operated to open the same and thereby release the work, by means of apparatus hereinafter described for forcing the sliding collar, or sleeve, toward the right-hand in Fig. 3, thereby compressing the aforesaid spring 118. The spring-chuck 110 is bored to receive the working end of the aforesaid stop-rod 99, which, as will be understood from Fig. 3, limits to the required distance the entrance into the chuck of the shaft or piece to be operated upon. When the chuck is closed onto the piece of work, it is by a motion toward the left-hand or into the bore of the spindle; this naturally, as the jaws of the chuck close onto the work, draws the work toward the left-hand a greater or lesser distance accordingly as the work is smaller or larger than the standard size. This, it will be observed, would vary the position of the pieces of work in the machine, were it not that on said closing movement of the chuck the end of the piece held therein is drawn against the stop-rod and thereby limited in its movement,—the jaws of the chuck, after the piece of work strikes said stop-rod, sliding very slightly on the work.

Figure 1:
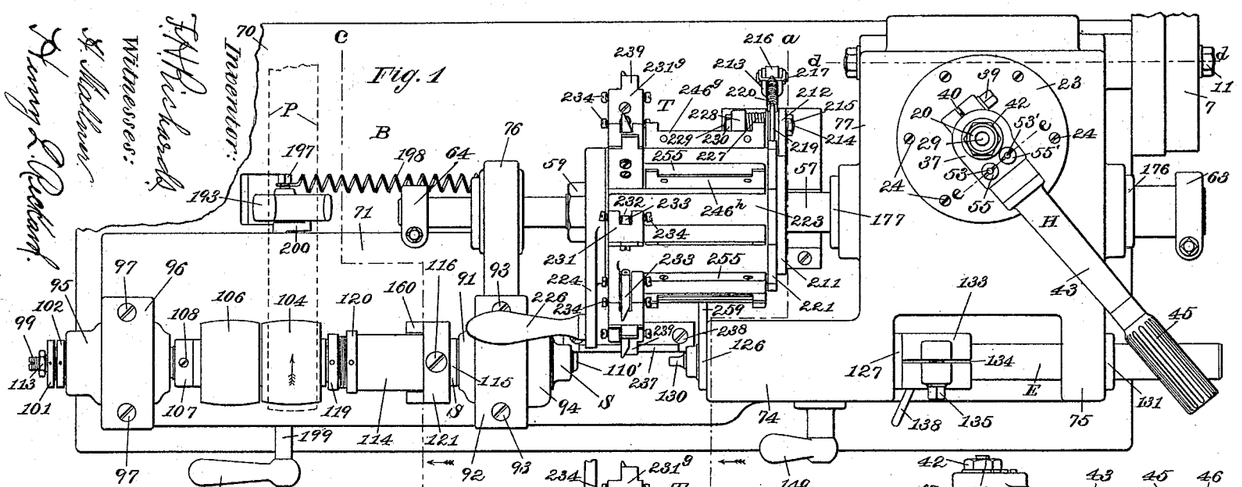
Figure 1 is a plan view of a turning machine embodying my present improvements.
Figure 2:
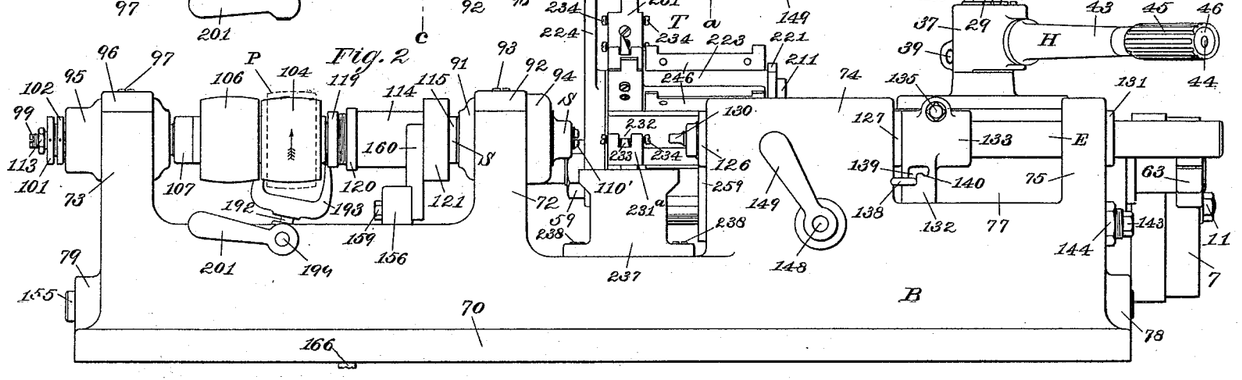
Fig. 2 is a front elevation of the machine.
Figure 12:
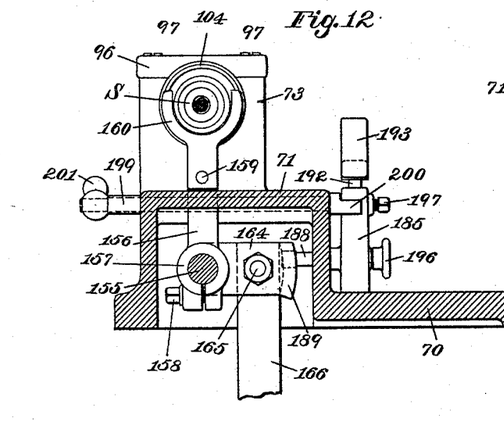
Fig. 12 is a transverse section in line $c\,c$, Fig. 1, showing the parts at the left-hand of said line.
Figure 13:
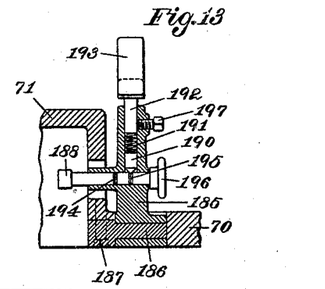
Fig. 13 is a sectional view of some of the details shown in elevation in Fig. 12.

The lathe-spindle S is intended to be driven by an ordinary belt or band, P, applied to the fixed pulley 104, and shown by dotted lines in Figs. 1 and 2; and for stopping and starting the spindle, a belt-shifting apparatus is provided for shifting the belt from the fixed pulley 104 to the loose pulley 106, and vice versa, as may be required. This belt-shifting apparatus is shown more particularly in Figs. 1, 2, 3, 7, and, especially, 12 and 13; and may be described in detail as follows:

The belt-shifter-arm, 185, is pivotally supported on a stud, 186, which is shown fixed in a recess or opening in the bed of the machine, by means of a screw, 187, shown in dotted lines in Fig. 13. Said arm 185 is provided with a longitudinally-shiftable pin, 188, adjustable in said arm; the inner end of said pin, when this is in its forward position, engages a cam, 189, which is formed on the arm 164 of the sleeve 163, which is operated by means of a treadle (not shown) carried by the treadle-rod 166. The arm 185 is bored to receive a detent-pin, 190, a detent-spring, 191, and the shank, 192, of the shipper-fork 193. The cam-pin 188 has formed thereon two detent-grooves, 194 and 195 respectively, in which the pointed end of the detent-pin 190 is adapted to engage. Said cam-pin 188 is also shown provided with a knob, or handle, 196, by means of which it may be thrown into or out of engagement with the shipper-actuating cam 189. When it is required to operate the shipper-arm by means of the cam 189, the cam-pin 188 is set in the position shown in Figs. 12 and 13, with the detent-pin 190 engaging the groove 195 of said pin. When it is desired to operate the shipper-arm by means of the hand apparatus hereinafter described, the operator, by means of the knob 196, pulls the cam-pin 188 backward, thereby disengaging said pin from the cam 189; owing to the form of the detent-grooves 194 and 195, and to the form of the pointed end of the detent-pin 190, the said cam-pin may be drawn outward from the position shown in Fig. 13, the pin 190 receding against the power of the spring 191, the tension of which is or may be regulated by means of the shipper-shank 192 which is adjustably fixed in the arm 185 by means of a set-screw, 197. When the pin 188 has been drawn back so as to stand free of the cam 189, said detent-pin snaps into engagement with notch 194.

As shown in Fig. 1, a spring, 198, is provided to normally hold the shipper-arm in the position shown in Figs. 1 and 2, so that the spindle-driving belt, or band, P, shall normally run on the fixed pulley, 104, of the lathe-spindle. The apparatus for operating the shipper-arm, or band-shifter, by hand, consists of a rod or shaft, 199, journaled in a suitable bearing in the part 71 of the head-block, and provided at its rearward end with a crank, 200, engaging the right-hand side of the shipper-arm 185; and at its opposite end provided with a handle, as 201, by means of which the operator may rotate said shaft. In Figs. 1, 2 and 12, the shipper-handle and shipper-arm are shown in their normal positions for running the spindle. To throw the shipper-arm over toward the left-hand in Figs. 1 and 2 and thus throw the belt onto the loose pulley 106 of the spindle, the operator grasps the handle 201 and carries it over toward the right-hand in said figures. This operates the crank 200 to throw the shipper-arm toward the left-hand in said figures, thus shipping the belt, or band, P, from the driving pulley 104 onto the loose pulley 106. On throwing the handle 201 over in the reverse direction to its first or normal position, the spring 198 returns the shipper-arm to its position shown in Figs. 1 and 2, thus re-shipping the belt from the loose pulley onto the driving pulley.

For operating the belt-shipper and the aforesaid chuck-actuating sleeve, and also to provide a means for retracting the so-called "dead" spindle of the lathe, I have provided a treadle-apparatus, which, in the preferred form thereof, is constructed and arranged as follows: The cam-shaft, or treadle-shaft, 155, is journaled in the bearings 78, 79 and 80, formed on the bed B, (as best illustrated in Fig. 3,) and is fitted for sliding movement in its bearings. A chuck-actuating arm, 156, is fitted onto said shaft by means of its hub 157, which is split on one side thereof and is clamped to the shaft by means of the clamp-screw 158, in a well-known manner. The arm 156 extends upward through an opening, 169, in the top-plate 71, and has fixed to its upper end (by means of the screw 159, or otherwise) a fork, 160, which engages one side of the collar, or flange, 121, of the sliding-sleeve 114 of the spindle. The hub 157 has a cam-face, 161, engaging a corresponding cam-face, 162, on the treadle-cam, or sleeve, 163; which sleeve is fitted for rocking movement on the shaft 155. An arm, 164, formed on the sleeve 163, extends rearward therefrom and has attached thereto (by means of a bolt, 165, or otherwise) a treadle-rod, 166, connecting said arm with an ordinary treadle not herein shown. By means of these devices, the operator is enabled to turn the sleeve 163 on the shaft 155, and thus through the said cam-faces to force the arm 156, and the cam-shaft 155 to which it is adjustably fixed, toward the right-hand in Fig. 3. A spiral push-spring, 167, is carried on the shaft 155, one end thereof butting against the middle bearing 80, and the opposite end against the hub 157, of the arm 156; this spring acts to return said arm 156 and shaft 155 (and through the cam-faces the sleeve 163) to place on the release of the treadle. The arm 164 extends rearward of the treadle-rod 166, and has formed thereon the cam 189 for operating the belt-shipper, as hereinbefore described. The spindle-retracting shaft 155 has a catch, 170, Figs. 3 and 15, for engaging a catch or bolt on the dead-spindle, for automatically retracting said spindle in certain cases, as hereinafter described.

Figures 14, 15, 16, 17, 18:
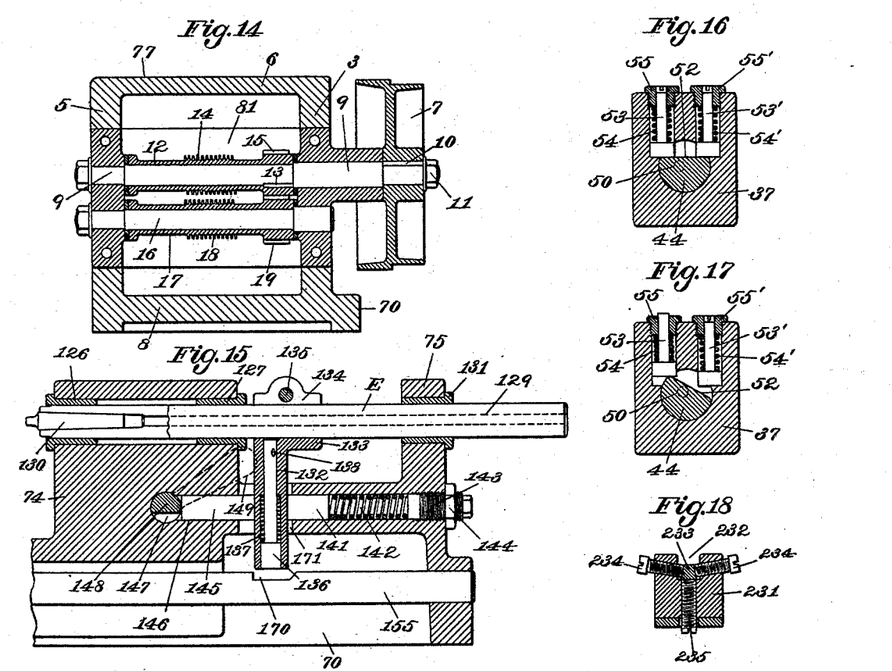
Fig. 14 is a sectional view in line $d\,d$, Fig. 1, showing the arrangement adopted for the driving portion of the feed mechanism.
Fig. 15 is a view similar to the right-hand portion of Fig. 3, showing the operative parts in different positions.
Fig. 16 is an enlarged sectional view, in line $e\,e$, Fig. 1, of the hand-lever of the feed mechanism.
Fig. 17 is a view similar to Fig. 16, showing the parts in a different position.
Fig. 18 is a sectional view of the turret-arm, in line $f\,f$, Fig. 11, and illustrates the manner of holding and adjusting the cutting tools.

The dead-spindle E is shown fitted to slide in the bearings 126, 127 and 131, as illustrated in Figs. 3 and 15. In Fig. 3 said spindle is shown in its normal position, and in Fig. 15 in its retracted position. Said spindle is shown as having a bore, 129, throughout the length thereof, which bore is enlarged and tapered at its forward end to receive the usual center 130. The spindle carries an arm, 132, which extends down through the spindle-arm guide-way, or slot, 171, and whose hub, 133, is split on one side, at 134, and is clamped to the spindle E by means of the clamp-screw 135. Said arm is bored to receive a plug, or latch-bolt, 136, and a spring, 137, the office of said spring being to normally hold the said plug down into engagement with the aforesaid spindle-retracting catch, or notch, 170, in the cam-shaft 155. An arm, or handle, 138, is fixed in the plug 136, and extends through a slot, 139, formed in the arm 132, by means of which said bolt may be raised to the position shown in Fig. 15, out of engagement with the aforesaid cam-shaft notch 170. The slot 139 has formed at the upper end and at one side thereof a detent-notch, or "lantern-catch," 140, into which the arm 138 may be dropped to hold the bolt 136 in its uppermost position.

Directly below the spindle E the bed B is bored to receive a thrust-pin, 141, and a spring, 142, engaging said pin; a screw, 143, is provided to regulate the tension of the spring; said screw being furnished with the usual check-nut 144. Another and similar thrust-pin, 145, is fitted to slide freely in a bore, 146, and to bear against the arm 132 in a direction opposite to the pin 141. The part 74 of the bed is also bored at 147 to receive the pin-actuating rod, or cam, 148, which is fitted to turn freely in its bearing, and is provided with a handle, 149, by means of which the operator may rotate it from its position in Fig. 3 to that in Fig. 15, and force the pin 145 toward the right-hand, and thereby (through the arm 132) retract the dead-spindle. In Fig. 3 the cam 148 is shown in its normal or inoperative position, and in Fig. 15 said cam is shown in its operative position, holding the slide E in its retracted position.

The series of cutting tools are carried by a turret arranged to have lateral and longitudinal movements in the machine. The lateral movement, which is preferably a rotary movement, is effected by hand-power, while the longitudinal movement may be effected both by power and by hand. The turret is carried by and upon a turret-supporter having, in the preferred form thereof herein shown, a shaft or spindle which is adapted to have rotary-reciprocating and longitudinal movements, either successively or simultaneously, as may be required for making any of the "cuts" within the scope of the machine. This manner of carrying the turret has the important advantage of securing a very firm support coupled with a very free and sensitive action, so that the operator may "sense" by his hands the action of the cutting tools, and thus be enabled to delicately control the movements of the machine for producing small and fine work. The turret-shaft is designated by 57, and carries the turret T removably and revolubly mounted thereon. Said shaft is shown carried by and in three bearings, 176, 177, and 178, all of which in the present instance are bushings of the same external diameter and fixed in accurate alignment in the framework. In practice, these three bearings are intended to be of hardened steel externally and internally ground to true cylindrical form to closely yet freely fit said shaft 57, so that this shaft shall have the required firm support and free movement.

For limiting the longitudinal movements of the turret-shaft, this is provided with the clamping stop-collars 63 and 64, at the right-hand and left-hand ends thereof, respectively. And for engaging the feed mechanism for imparting a longitudinal movement to the shaft, this is provided with a rack, 56, which in practice (and since the shaft is designed to be rotated for purposes of adjustment, as hereinafter described), I make of the form of a screw-thread. A minor advantage of this form of rack is that it may be very accurately produced by means of the screw-cutting lathe, and also that the gear or pinion meshing therewith may be similarly produced by "hobbing," in the well-known manner of constructing worm-wheels.

Figure 6:
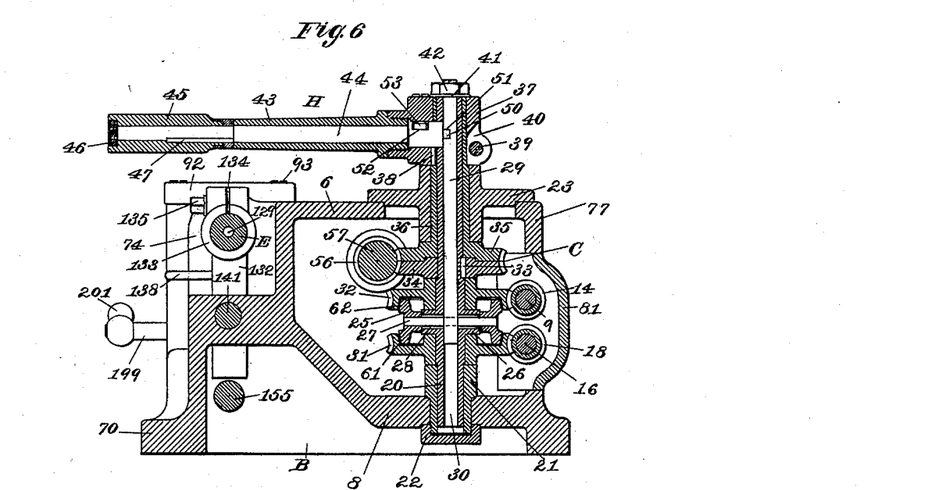
Fig. 6 is a vertical transverse section through the feed-shaft.
Figure 7:
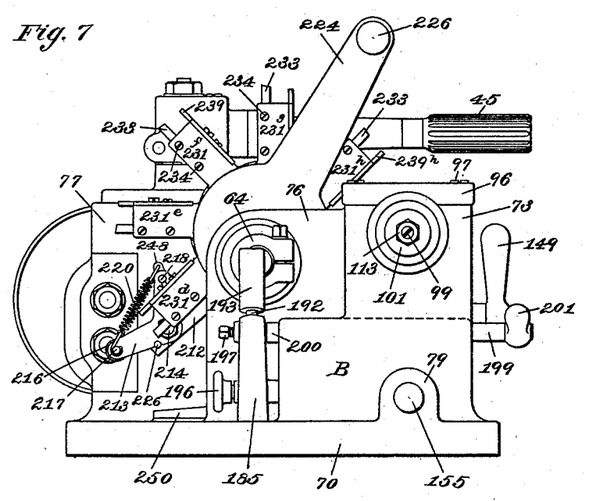
Fig. 7 is an end elevation of the machine, as seen from the left-hand in Figs. 1 to 4, inclusive.

For the purpose of imparting longitudinal movements to the turret-shaft 57, either by hand or by power, (or both,) I employ in connection with my present improvements the feed mechanism which is described and claimed in my prior application, Serial No. 420,170, filed February 3, 1892, to which reference may be had. For the purposes of this application, however, said feed mechanism and the operation thereof may be described as follows:

The operative parts of the feed mechanism are shown supported by the box-shaped portion of the framework, which portion consists of the bottom-plate 8, end walls 3 and 5, and top plate 6. Said end walls are furnished, respectively, with the bearings 176, 177, for the turret-shaft, or turret-supporter, 57, hereinafter more fully described. This shaft, or the portion thereof in and between said bearings 176 and 177, may, for the purposes of this description, be considered as a portion of the feed mechanism. The hollow hand-lever shaft 20 is carried by bearings, 21 and 23, fixed to said bottom-plate and top-plate, respectively; and carries a gear, C, which meshes closely with the thread 56 of said shaft 57. The lower bearing 21 is held in place by the nut 22; while the upper bearing 23 is fixed to the framework by screws, 24. The gear C is of the character of a worm-wheel, since the rack 56 is of the form of a screw-thread; and is made, in practice, of two parts, for the purpose of taking up wear. The lower gear-part 34 is fixed to the shaft 20 by the key 33; the upper gear part 35 fits on the lower part, and is slightly adjustable thereon, after the well-known manner of the similar gears used in profiling machines. The upper part 35 of the worm-wheel C has formed thereon a hub, or sleeve, 36, which extends upward through the bearing 23, and has a hub, 37, fixed thereon by means of a key, 38, or a binding-screw, 39, or both; when the binding-screw is used, the hub 37 is split as at 40, to permit of the clamping of said hub onto the sleeve 36. A washer, 41, and a nut, 42, screwed onto the upper end of the shaft 20, holds the parts in place. The hand-lever for actuating the mechanism by hand, is designated in a general way by H, and consists principally of the said hub 37 and the hollow arm 43, which is screwed into said lever-hub and forms a bearing for the eccentric-rod 44, that extends through said arm and has fixed to the outer end thereof a handle, 45. Said handle, which is movable on the hand-lever, is held in place by means of a nut, 46, and is prevented from turning on the rod 44 by means of a key, 47, as shown in Fig. 6. The enlarged inner end of the rod 44 is furnished with an eccentric, or crank-pin, 50, which engages in a notch, 51, formed in the rod 29. The enlarged part of the rod 44 has a flattened spot, 52, as best illustrated in Figs. 16 and 17, which show the rod 44 in its medial position and one of its terminal positions, respectively; the position of the eccentric-pin 50 being shown in dotted lines. As therein shown, the hub 37 of the handle H is bored to receive a pair of "plugs," or thrust-pins, 53—53', and a pair of springs, 54—54', which are held in place by nuts, 55—55'. The springs 54 and 54' force the pins 53 and 53' down onto the opposite ends, respectively, of the flattened spot 52, and thus tend to hold said rod normally in the medial position shown in Fig. 16. The operator having, by means of the handle 45, turned the rod 44 over toward the right-hand, as shown in Fig. 17, on releasing said handle the pin 53 and spring 54 above described operate to return said rod to its normal position illustrated in Fig. 16. When the rod is turned over toward the left-hand, the pin 53' and spring 54' act in a similar manner to return the rod to the same position. A friction-wheel, 25, is freely fitted onto a flange, or collar, 26, of the shaft 20; a key, 27, passes through said wheel and through a mortise, 28, in the shaft 20, which mortise is of sufficient width to permit of a slight vertical movement of the said key. The key 27 passes through a rod, 29, which is fitted to slide vertically in the bore, 30, of the shaft 20, and connects with the crank, 50, of said rod 44. A worm-wheel, 31, meshing with the worm 18 on shaft 16, and having on the upper side thereof a friction-face, 61, to engage the friction-wheel 25, is fitted to freely rotate on the feed-shaft 20 immediately below the collar 26 thereof. Immediately above said collar 26 is similarly fitted another worm-wheel, 32, having on its lower side a friction-face, 62, for engaging the friction-disk 25, said worm-wheel meshing with the worm 14 on shaft 9. Referring to Fig. 14, said worm 14 is shown formed on a sleeve, 12, which is carried on said shaft 9 between the end walls 3 and 5, and is fixed thereon by a key, 13. Said sleeve 12 has thereon a pinion, 15, which meshes with the corresponding gear 19 formed on another sleeve, 17, that is carried on another and similar shaft, 16. The sleeve 17 has formed thereon a worm, 18, similar to the aforesaid worm 14. The two shafts, being thus geared together, rotate in opposite directions. The two shafts 9 and 16 are carried in bearings formed in the ends of the driving-gear-frame 81, which frame is shown inserted in a space formed therefor in the rearward side of the said box-portion of the framework. The sliding shaft 57 may be rotated in its bearings to carry the same longitudinally of the mechanism for adjusting the position of the turret T relatively to the position of the handle H, so as to bring said handle into the most convenient position for use as required in any particular case.

Power may be applied to the feed-mechanism by means of an ordinary belt applied to the driving pulley 7, which is shown removably fixed by means of the key 10 and nut 11 to the right-hand end of the driving-shaft 9, outside of the end wall, 3, of the framework, as shown best in Figs. 6 and 14.

In using the feed mechanism, the operator grasps the handle, 45, of the hand-lever H, and by swinging the lever toward the right or left hand, imparts, through the gear C and the shaft 57, a corresponding movement to the turret T hereinafter described. Whenever during the stroke of said turret it is required to actuate said turret by power, the operator, without releasing his grasp, turns the handle 45 in the direction of the required movement. By turning said handle from the position indicated in Fig. 16 over toward the right to the position indicated in Fig. 17, the crank-pin, 50, of the rod 44 draws upward the rod 29 to force the clutch-disk into engagement with the upper clutch-wheel 32, which is actuated by means of the driving mechanism hereinbefore described to turn the shaft 20 toward the right-hand in Figs. 1 and 2. By turning the handle 45 in the reverse direction, the connecting parts described throw the clutch-disk into engagement with the lower clutch-wheel 31, which revolves in a direction opposite to wheel 32 and actuates the shaft 20 to swing the lever H toward the left-hand in Fig. 1. On releasing the handle 45 during the swinging movement of the hand-lever in either direction, the spring 54, or 54', (as the case may be,) operates as hereinbefore described to return the rod 44 and handle 45 to their aforesaid medial positions.

By means of a feed mechanism of the character described, the turret-shaft 57 and the turret carried thereon may be operated by hand in either direction, and power may be applied for the continuance of said movement without the operator releasing his grasp from the hand-lever or relinquishing his control (in a general way) of said turret.

For the purpose of carrying the series of cutting-tools, a turret is revolubly mounted on the turret-shaft to have a forward and backward, or "lateral," movement in the machine on the turning of said shaft in its bearings. For this purpose, the turret-shaft has removably fixed thereto, on the slightly tapered portion 58 thereof, the eccentric turret-bearing 210. For turning said shaft and eccentric, a hand-lever, 224, is fitted on the shaft contiguous to one end of the eccentric, and is held in place by the nut 59 and a dowel-pin, or key, 225, that extends through the hub of the hand-lever into one end of the eccentric, as will be understood from Fig. 4. Said hand-lever is shown furnished with the handle 226, whereby the lever, and through this the turret-shaft and the eccentric turret-bearing, may be given rotary-reciprocating movements.

The tool-carrying turret, designated in a general way by T, is mounted to turn freely yet closely on the eccentrically-supported journal, or bearing, 210, between the hub of said hand-lever 224 and the collar, or shoulder, 211, of said bearing. As a means of rotating the turret on its said bearing, there is provided at one end of the turret-sleeve 223 a ratchet-wheel, 221, which in the present instance is shown made of a separate piece fixed to the end of the turret by means of pins, 222. Said ratchet-wheel bears against the aforesaid turret-bearing-flange 211, which is extended to form the pawl-carrying arm 212. The angle-lever 213 is pivotally attached to the arm 212 by means of a stud, 214, and nut, 215, and is furnished at its lower end with the anti-friction roll 216, carried by the pin 217 fixed in said lever. Said lever at its upper end has pivoted therein the pawl 219, which is supported on the pivot-pin 218, and engages the teeth of said ratchet-wheel 221. A spiral spring, 220, one end of which is attached to the arm 248 of the pawl 219 and the opposite end to the pin 217, operates to normally hold the said pawl in engagement with said teeth. A stop-pin, 226, is fixed in the arm 212 to limit the return stroke of said lever relatively to this arm. The torsion-spring 227 is carried on the stud 214, one end of said spring being fixed in the arm 213 and the opposite end in a friction-collar, 228, that is forced onto the tapered end, 229, of the stud 214, by means of the nut 230; the office of said spring is to normally hold the angle-lever 213 against the said stop-pin 226.

Figure 8:
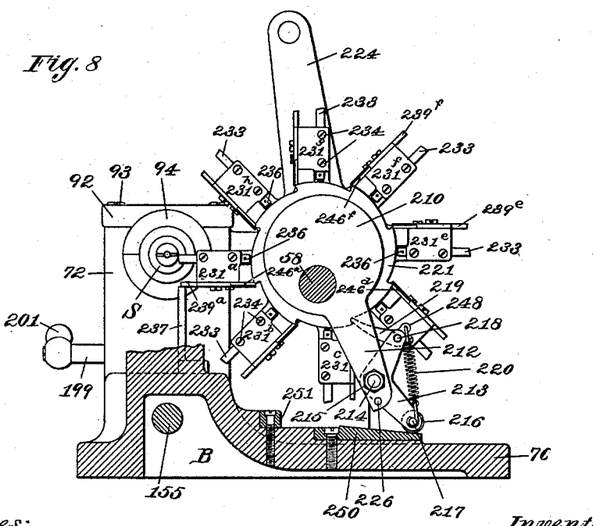
Fig. 8 is a transverse section, in line $a\,a$, Fig. 1, showing the tool-carrying turret in position for beginning the working stroke.
Figure 10:
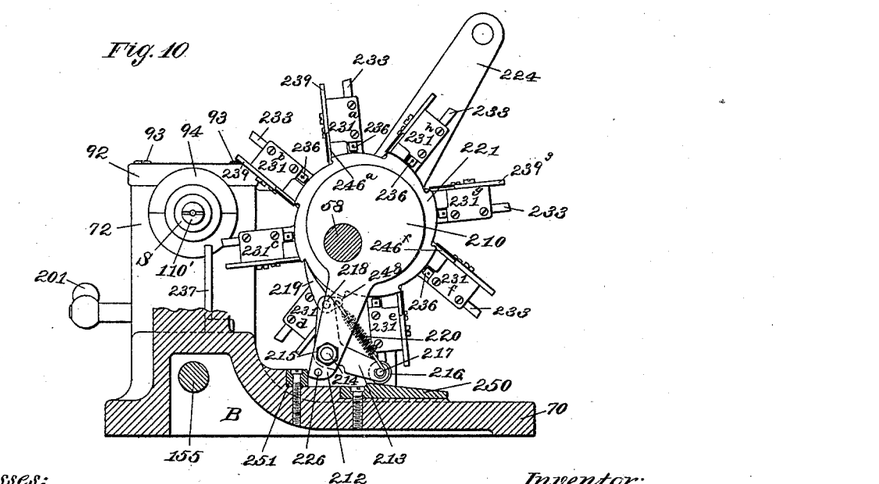
Fig. 10 is a view similar to Figs. 8 and 9, showing the turret-carrying eccentric thrown back as at the close of the turret-feeding movement.

On the base-plate, 70, of the framework, immediately underneath the turret-actuating devices hereinbefore described, I have provided a lever-actuating-cam, or plate, 250, for engaging the roller, 216, of the angle-lever 213 for the purpose of actuating said lever to turn forward the turret T. This operation is illustrated in Figs. 8 and 10, representing the beginning and ending of the turret-advance movement. When the parts stand in the position shown in Fig. 8, the angle-lever 213 resting against the stop 226, the roller 216 resting against said cam-plate 250, and the pawl 219 engaging a tooth of the ratchet-wheel 221, the operator, seizing the lever 224, forcibly moves it backward from the position shown in Fig. 8 to the position shown in Fig. 10, (this movement being limited by the lower end of the arm 212 striking the stop 251,) thereby swinging the angle-lever 213 on its pivot 214, from its position in Fig. 8 to its position in Fig. 10, and, through the said lever and the pawl 219, turning forward the turret through one of its divisions. On retracting the hand-lever from its position in Fig. 10 to its position in Fig. 8, the spring 227 returns the angle-lever to its position in Fig. 8, the spring 220 meanwhile holding the pawl 219 against the ratchet-wheel 221.

The turret-sleeve 223 has formed thereon a series of projecting tool-arms, or tool-holders, 231$^a$, 231$^b$, &c., (in the present case eight in number,) which are alike in form and construction; a description of one of them is, therefore, deemed sufficient. In Fig. 18, one of said tool-holding arms is shown in section, drawn on an enlarged scale, and has formed therein a groove, 232, for receiving the cutting-tool 233. Said tool is beveled on the opposite sides thereof, as shown in the cross-section thereof in Fig. 18, and is held in place by means of oppositely-disposed set-screws, as 234, which stand at an angle corresponding to the bevel of the tool. The set-screws bearing against the beveled sides of the tool hold the same down onto the bottom of the slot 233, and also furnish a means for the lateral adjustment thereof. Other set-screws, as 235, are provided for elevating the inner end of the tool to finely regulate the elevation of the point thereof. For adjusting the tool radially of the turret, a screw, 236, is carried in the turret-sleeve 223, the head of which screw bears against the inner end of the tool; by means of this screw the tool may be forced outward when desired.

Figure 9:
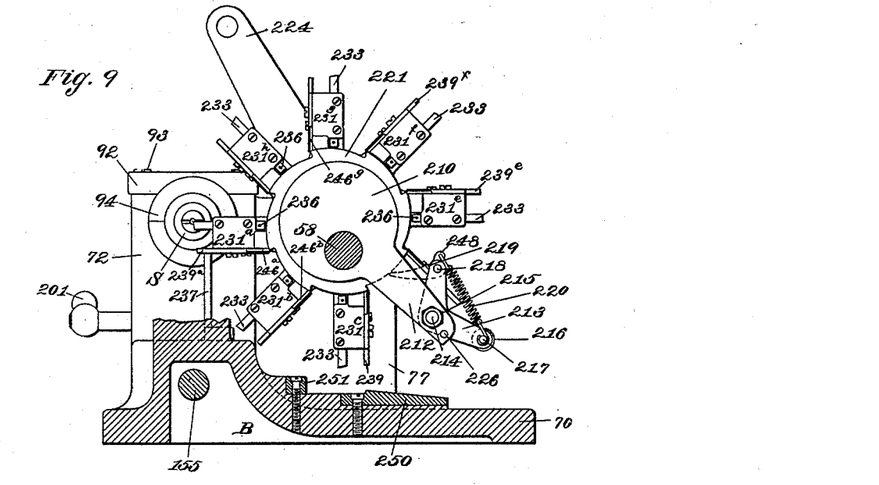
Fig. 9 is a view similar to Fig. 8, showing the turret in its forward position, as when making the cut.

For supporting the tool-arm which is being used, at the proper elevation in the machine, (as shown, for instance, in Figs. 8 and 9,) a rest, 237, similar in character to the rests ordinarily used on hand-lathes, is suitably fixed to the framework, as, for instance, by screws 238. Each of the tool-holding arms of the turret is provided with a stop-plate, 239, which is shown held in place by the screw 240, and which should usually be made of hardened steel; if preferred, however, said stop 239 may, obviously, be formed integral with the arm 231. When the lever 224 is drawn forward from the position shown in Fig. 8 (representing the beginning of a diametrical cut) to the position shown in Fig. 9 (representing the end of said cut), said stop 239 slides forward on the rest 237, similarly as a hand-tool is slid forward by a workman using the ordinary hand-lathe for making a similar cut. The force of the cut is, therefore, taken almost directly by said rest 237, since this is located directly underneath the cutting-tool.

Figure 11:
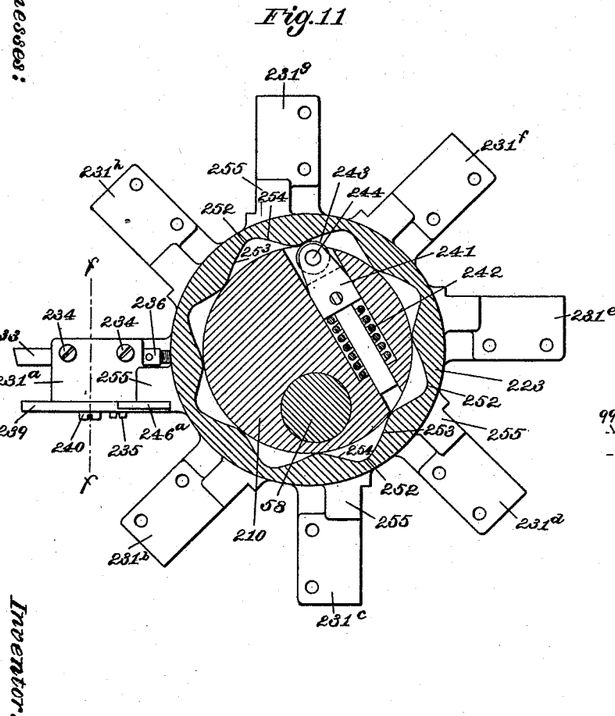
Fig. 11 is a vertical transverse section, in line $b\,b$, Fig. 4.

In order to maintain a sufficient pressure of the tool-arm downward against its supporting rest 237 during the making of a cut, the turret-carrying journal 210 is furnished with a resistance-device, also designated as a pressure-device, acting between the turret and its supporter, preferably as shown, upon suitably-shaped internal cams, or notches, formed in one end of the turret, as more fully illustrated in the enlarged view, Fig. 11. The eccentric journal 210 is bored to receive the plug, or piston, 241, and the push-spring 242 for actuating said plug, or plunger, to force the same outward. The outer end of said plug is provided with the roller 243, carried on a pin, 244, fixed in the plug; which roller bears against the inwardly-projecting cam 252. This cam, as will be seen in said figure, has the forward and rearward faces, 253 and 254, respectively. In the positions shown in Figs. 8 and 9, and at all points intermediate thereto, said cam-roll 243 bears against the forward, or detent, face 253 of the detent-cams, and thus tends to throw the turret forward in the machine on the turning forward of its supporting journal; this means bears the tool-holding arm of the turret down upon the stop 237 with a force corresponding to the strength of the aforesaid spring 242. During the turning forward of the turret as hereinbefore described in connection with Figs. 8 and 10, the turret is forcibly turned over on its journal, the roller 243 passing from one of the detent-faces 253 over to the corresponding face of the next cam.

For determining the length and depth of the cuts to be made by means of the tools carried in said tool-holders, the turret is provided with a corresponding series of patterns, or gages 246ª, 246ᵇ, &c. These gages are conveniently secured to the ribs 255 which are formed on the turret-sleeve and extend, in the present instance, from the corresponding tool-arms to the opposite end of said sleeve. Said patterns, or pattern-plates, are preferably fixed in place by means of screws and dowel-pins, after the well-known manner of fixing patterns to profiling fixtures. The outer edges of the pattern-plates 246 are shaped to correspond with the series of cuts required to be made by the corresponding tools respectively.

Figure 19:
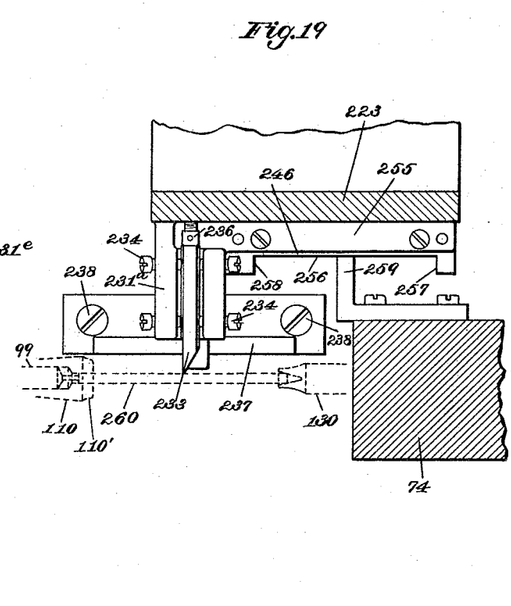
Fig. 19 is a diagrammatic plan view similar to a portion of Fig. 1, illustrating the operation of the machine.

For instance, in Figs. 1 and 19, the pattern-plate 246ᵍ has the tool-guiding surface 256 governing the depth of the cut, and the shoulders, or stop-faces, 257 and 258, for limiting the right-hand and left-hand ends of the cut, respectively. When it is required to turn a tapering piece, the edge of the surface 256 is made inclined longitudinally of the turret-axis; and by making said surface curved or otherwise irregular, a curved or correspondingly irregular shaped article may be produced by the machine. Of course, the several tools and their corresponding patterns must be properly fitted for the making of the successive cuts required in any particular instance.

For co-acting with the patterns, or gages, 246, the framework of the machine is provided with a pattern-stop, or abutment, 259, Figs. 1 and 2, corresponding in position substantially with the middle part of the patterns when the turret is at the middle part of its longitudinal stroke. The stop, or abutment, being (usually and preferably) a fixed part of the machine, of course the same pattern, when it is brought into use, will always control the corresponding tool in the same manner. When it is required to change the machine from the making of one-shaped piece to another, the turret may be removed bodily and another substituted therefor provided with tools and patterns suitable for the new work; or, one set of tools and patterns may be removed from the turret in the machine and another set substituted in their place.

The general operation of the turning machine is as follows: The handle 201 being thrown over into the position shown in Fig. 2, thereby permitting the belt-shifter to become automatically operative; the handle 149 being in the position shown in Fig. 2 and the bolt 136 engaging in the notch 170 of the clutch-shaft 155; and the turret mechanism being in the position shown in Fig. 8, ready for the making of a cut—the turret having been previously furnished with the required series of cutting-tools and corresponding patterns — the operator, by pushing back the treadle-lever 166, turns the sleeve 163 and its cams to force the arm 156 and shaft 155 toward the right-hand in Fig. 3, thereby retracting the dead-spindle E, sliding forward the sleeve 114 to open the clutch 110 ready to receive the piece of work, and shifts the belt, or band, P, from the tight band-pulley 104 to the loose band-pulley 106. The operator now placing the piece of work—as a clock-spindle or shaft, 260, Fig. 19 in the work-holding spindle,—one end in the chuck-jaws 110′ and the other end close to the center 130, (the spindle E having previously been properly adjusted therefor in the arm 132 by means of the clamp-screw 135, as hereinbefore described,) he releases the treadle 166, when the spring 167, acting through the cam-faces 161 and 162, turns back the sleeve 163 to its original position, and, by the corresponding operation of the shifter-cam 189, permits the spring 198 to operate the band-shifter to carry the band from the loose pulley 106 back onto the tight pulley 104, thereby starting the spindle revolving. At the same time, the spring 118, acting through the adjusting-screw 119, sleeve 118 and screw 116, draws the chuck into the taper 109 of the spindle, thereby closing the jaws 110′ onto the work, as shown, for instance, in Fig. 19. On the retractive movement aforesaid of the shaft 155, the spring 142, acting through the connections described, throws forward the spindle E to engage the center 130 thereof with the end of the piece of work 260, as also indicated by dotted lines in said Fig. 19. The piece of work to be operated upon being now in place and the machine in operation, (the feed mechanism being independently operated through the pulley 7 and the connecting mechanism,) the operator, seizing the handle 226, draws forward the lever 224 from the position shown in Fig. 8 to the position shown in Fig. 9, thereby bringing the tool of the arm 231$^a$ (which bears during this time on the tool-rest 237) forward to the work until stopped by the pattern-face 256 striking the pattern-stop 259; when this position is reached, the operator, seizing the handle 45 with his other hand, carries said handle toward the right or left, as the case may require, to move the tool to the right or left for the making of a cut on the shaft or spindle 260, according to the pattern therefor provided. If this cut is of considerable length or requires to be regularly made—as, for instance, for a finishing cut—the operator, by turning the handle 45, throws into action the automatic feed mechanism to feed the turret-shaft 57 to carry the turret toward the right or left, as may be required; releasing the feed mechanism, on the finishing of the cut, by return of said handle 45 to its normal position, as hereinbefore described in connection with Figs. 16 and 17. Having finished a cut with one of the tools of the turret, the operator forces back the lever 224 to first carry the tool back to its position in Fig. 8, and then continues the backward movement of said lever to the position shown in Fig. 10, thereby, through the action of the turret-feed mechanism described, turning forward the turret on its laterally-movable supporter 210 to bring the tool-arm 231$^b$ into position ready for use; on again bringing forward the mechanism from the position shown in Fig. 10 to that shown in Fig. 8, the tool-arm 231$^b$ will be carried down from the position shown in Fig. 10 to the position of the arm 231$^a$ shown in Fig. 8, thereby bringing another tool into position for making a cut, and its corresponding pattern into position adjacent to the pattern-stop 259. After this, the operator proceeds as before to make a second cut, and following this brings each of the required number of tools successively into use. If in any particular case a lesser number of tools are required than the turret may be constructed for receiving, the operator can readily move the unemployed tool-arms past the position for use, by repeating the turret-actuating movement of the lever 224. During the making of a cut, the tool-arm is held down upon the tool-rest 237 by means of the pressure-device acting between the turret-supporter and the turret, as hereinbefore described in connection with Fig. 11. All of the required series of cuts having been completed, the operator releases the turret-actuating levers, leaving the lever 224 in the position shown in Fig. 8, where it will normally remain, owing to the action of the aforesaid pressure-device intermediate to the eccentric-bearing and the turret, and of the spring 227 acting through the lever 213 against the cam-plate 250. Next, the operator pushes back the treadle-arm, and, through the connecting apparatus before described, again shifts the belt P onto the pulley 106, throws back the spindle E, and opens the chuck 110, thereby releasing the piece of work 260, which may then be removed and a new piece be put in place, ready for a repetition of the series of operations.

No detailed description of a complete series of tools and patterns therefor has been made herein, since the fitting up of the tools for any given series of cuts is the same substantially as the fitting up of the tools ordinarily employed in the so-called "gages" heretofore employed for the turning of clock-spindles and the like; and it is, of course, a simple matter, in view of the preceding description, to fit the corresponding patterns for properly limiting the respective cuts of a series of them.

In the machine shown in the drawings, the turret being located at the rearward side of the spindles, of course the lathe-spindle should run over toward the rearward side of the machine, in a direction opposite to the more usual practice. By means of this arrangement, however, the operator has the advantage of pulling on the lever 224, rather than pushing on the same, for the purpose of making a diametrical cut and for holding the patterns in use against the pattern-stop 259; it being found, in practice, that this arrangement is more convenient and the operation is more easily performed.

Having thus described my invention, I claim—

1. In a turning machine, the combination with the spindle, of an eccentrically-supported and longitudinally movable turret-supporter located at one side of the spindle, a tool-carrying turret revolubly mounted on said turret-supporter and having its axis of revolution longitudinally of the spindle-axis, means for moving the turret-supporter laterally to carry its tool toward and from the spindle-axis, and means for moving the turret-supporter longitudinally of the spindle.

2. In a turning machine, the combination with the spindle, and with a shaft located longitudinally of the spindle at one side thereof, of the eccentric turret-supporting bearing carried on said shaft and adapted to have a movement laterally of the spindle to carry the turret toward and from the axis of the spindle, a tool-carrying turret revolubly mounted on said turret-bearing, and means for turning the shaft to move the turret laterally of said spindle-axis.

3. In a turning machine, the combination with the lathe-spindle, and with the pattern-stop, of a laterally-movable turret-supporter, the turret revolubly mounted on said supporter and constructed to carry a series of tools, and a series of patterns carried on the turret and corresponding to said tools respectively.

4. In a turning machine, the combination with the lathe-spindle, and with the fixed pattern-stop, of the turret-bearing located at one side and longitudinally of the spindle, a tool-carrying turret revolubly mounted on the turret-bearing, one or more patterns carried on the turret and corresponding to the cutting tools thereof, and means for imparting lateral and longitudinal movements to the turret.

5. In a turning machine, the combination with the lathe-spindle, a tool-rest adjacent to the spindle, and a fixed pattern-stop, of the eccentric turret-bearing located at one side and longitudinally of the spindle, a turret revolubly supported on said bearing and having projecting tool-arms, patterns corresponding to said arms and carried on the turret and adapted to bear against said stop, and means for turning said bearing for bringing the corresponding tools and patterns successively into position for use.

6. In a turning machine, the combination with the lathe-spindle, a tool-rest adjacent to the spindle, and a fixed pattern-stop, of a sliding shaft located at one side and longitudinally of the spindle, an eccentric bearing on said shaft, a turret revolubly supported on said bearing and having radially-projecting tool-arms, patterns corresponding to said arms and carried on the turret and adapted to bear against said stop, means for turning said bearing for bringing the corresponding tools and patterns successively into position for use, and means for sliding said shaft.

7. In a turning machine, the combination with the spindle, of an eccentrically-supported turret-bearing, a tool-carrying turret revolubly supported on said bearing, and means for turning the bearing to carry the turret toward and from the spindle.

8. In a turning machine, the combination with the spindle, of an eccentrically-supported turret-bearing, a tool-carrying turret supported on said bearing, means for revolving the turret on the bearing, and means for turning the bearing to carry the turret toward and from the spindle.

9. In a turning machine, the combination with the spindle, of an eccentrically-supported turret-bearing constructed and arranged to have rotary-reciprocating and longitudinal movements, a tool-carrying turret supported on said bearing, and means for imparting rotary-reciprocating and longitudinal movements to the turret-bearing.

10. In a turning machine, the combination with the spindle, of an eccentrically-supported turret-bearing constructed and arranged to have rotary-reciprocating and longitudinal movements, a tool-carrying turret supported on said bearing, means for revolving the turret on said bearing, and means for imparting rotary-reciprocating and longitudinal movements to the turret-bearing.

11. In a turning machine, the combination with the spindle, of an eccentric turret-bearing carried by a shaft and arranged to have rotary-reciprocating and longitudinal movements, a tool-carrying turret supported on said bearing, means for imparting rotary-reciprocating movements to the turret-bearing, a lever operatively-connected to the shaft of the turret-bearing for imparting longitudinal movements thereto, and a ratchet mechanism constructed and arranged to advance the turret on the retractive rotary movement of the turret-bearing.

12. In a turning machine, the combination with the lathe-spindle and with the fixed pattern-stop, of a tool-carrying turret revolubly supported with its axis at one side and longitudinally of the spindle-axis, a series of tools carried on the turret, and a corresponding series of patterns carried on the turret and adapted to bear against said stop, and means for bringing the corresponding tools and patterns successively into position for use.

13. In a turning machine, the combination with the lathe-spindle and with the fixed pattern-stop, of a tool-carrying turret revolubly supported with its axis at one side and longitudinally of the spindle-axis, a series of tools carried on the turret, a corresponding series of patterns carried on the turret and adapted to bear against said stop, turret-advancing means for bringing the corresponding tools and patterns successively into position for use, and means for imparting a longitudinal movement to the turret.

14. In a turning machine, the combination with the lathe spindle, and with a fixed pattern-stop and a tool-rest adjacent to the spindle, of a turret revolubly supported with its axis at one side and longitudinally of the spindle-axis and having projecting tool-arms, corresponding patterns carried on the turret and adapted to bear against said stop, and turret-advancing means for bringing said arms successively onto said tool-rest and the corresponding patterns to the pattern-stop.

15. In a turning machine, the combination with the spindle, of the eccentrically-supported rotary-reciprocating turret-bearing, the tool-carrying turret revolubly mounted on said bearing, a pressure-device acting between the bearing and turret, and a ratchet mechanism constructed and arranged to revolve the turret on the bearing on the retractive movement of the bearing beyond its working stroke, substantially as described.

16. In a turning machine, the combination with the spindle, of the eccentrically-supported rotary-reciprocating turret-bearing, the turret revolubly mounted on said bearing and having tool-carrying arms substantially as described, a turret-arm supporting rest adjacent to the spindle, and a pressure-device acting between the turret-bearing and the turret on the forward movement of said bearing, for holding the turret-arm onto the rest during the making of a cut, substantially as described.

17. In a turning machine, the combination with the eccentrically-supported turret-bearing, of the turret revolubly mounted on said bearing and having a series of tool-carrying arms and a corresponding series of detent-cams internally thereof, and a spring-actuated pressure-device carried by the bearing and acting against said cams, substantially as described.

18. In a turning machine, the combination with the eccentrically-supported turret-bearing, of the tool-carrying turret revolubly mounted on said bearing and having a series of detent-cams internally thereof, the plunger 241 carried in said bearing and fitted to bear against said cams, and a spring forcing the plunger against the cams, substantially as described.

19. In a turning machine, the combination with the eccentric turret-bearing having means for turning the same, of the tool-carrying turret mounted on said bearing and having the ratchet-wheel, a fixed lever-actuating cam on the framework, and a ratchet-lever carried by the eccentric bearing and having a pawl engaging said ratchet-wheel, whereby the turret is turned forward by the action of said fixed cam, through said lever, on the turning backward of the eccentric-bearing, substantially as described.

20. In a turning machine, the combination with the eccentric bearing having the arm 212, and with a fixed lever-actuating cam substantially as described, of the stud 214 fixed in said lever, the lever 213 carried on said stud and adapted to be actuated by said cam on the swinging movement of said arm, the pawl 219 carried by said lever, the ratchet-wheel revolubly mounted on the eccentric bearing, and means for holding the pawl normally in engagement with said wheel.

21. In a turning machine, the combination with the eccentric bearing having the arm 212, and with the fixed cam 250, of the turret mounted on said bearing and having the ratchet-wheel 221, a detent acting between the eccentric bearing and turret, the lever 213 pivotally supported on the arm 212 and having a pawl engaging the ratchet-wheel and adapted to be actuated by said fixed cam, and means for holding the pawl normally in engagement with the ratchet-wheel and for retracting said lever.

22. In a turning-machine, the combination with the spindle and its chuck, of the sliding chuck-actuating shaft and connections therefrom to the chuck for opening the same, the dead-spindle connected with said chuck-actuating shaft to be retracted on the movement of said shaft to open the chuck, and means for sliding said shaft, substantially as described.

23. In a turning machine, the combination with the dead-spindle, of the sliding shaft 155, the arm fixed on said spindle, and a bolt carried by the spindle-arm whereby this may be engaged with and disengaged from said shaft, substantially as described.

24. In a turning machine, the combination with the dead-spindle, and with the sliding shaft 155 having the notch 170, of the arm 132 fixed to the spindle, the bolt 136 engaging said shaft-notch, means for withdrawing the bolt from engagement with said shaft, and a spring normally projecting the bolt into said notch, substantially as described.

25. In a turning machine, the combination with the dead-spindle, and with the shaft having a spindle-retracting notch, of the arm fixed to the spindle and carrying a bolt adapted to be engaged with and disengaged from said notch, the spring normally throwing forward the spindle, and means for retracting the spindle independently of the movement of said shaft, substantially as described.

26. In a turning machine, the combination with the framework having bearings for the dead spindle, and having therein a guide-way, as the slot 171, of the spindle fitted to slide in said bearings, the arm fixable on the spindle and working in said guide-way, the spindle-retracting shaft 155, means for engaging said arm with and disengaging it from said shaft, and a pressure-device acting to normally throw forward the spindle, substantially as described.

27. In a turning machine, the combination with the framework having bearings for the dead-spindle, and having therein a spindle-arm guide-way, of the dead-spindle fitted to slide in said bearings and having the arm 132 fixable thereon and fitted to slide in said guide-way, the shaft 155 having the spindle-retracting catch, means substantially as described for engaging said arm with and disengaging it from said catch, a pressure-device acting to normally throw forward the spindle, and the cam arranged and connected for retracting the spindle independently of the movement of said shaft, substantially as described.

28. In a turning machine, the combination with the turret having the projecting tool-holding arm, and with the lifting-screw 235 of the beveled tool 233, and the oppositely-disposed screws set in said arm to bear downwardly and laterally against the tool for holding and adjusting the same in the arm, substantially as described.

29. In a turning machine, the combination with the spindles, and with the tool-rest longitudinally thereof, of a turret having a projecting tool-arm substantially as described adapted to bear on said rest, the tool carried in said arm, and means for adjusting the tool in the arm, and a gage on the turret for limiting the movement of the arm and tool toward the spindle, substantially as described.

30. In a turning machine, the combination with the spindles, and with the tool-rest longitudinally thereof, of the turret having a tool-holding arm substantially as described adapted to bear on said rest, the tool in said holder, means for adjusting the tool laterally thereof in the holder, and a screw for elevating the tool whereby to adjust the height of the tool relatively to the spindle-axis, and a gage on the turret for limiting the movement of the arm and tool toward the spindle, substantially as described.

31. In a turning machine, the combination with the work-holding spindles and the tool-rest, and with the fixed pattern-stop, of the turret adapted to be moved laterally and longitudinally of the spindles and having a tool-holding arm adapted to bear on said rest, a pattern carried on the turret and having the pattern-face and the stop-faces whereby to limit the movements of the turret relatively to said stop, and a tool adjustably fixed on said tool-holding arm whereby the point of the tool may be adjusted relatively to the work and to the pattern, substantially as described.

32. In a turning machine, the combination with the work-holding spindle, the tool-rest, and the pattern-stop, of a turret having a tool-arm bearing on said rest, a pattern on the turret having a pattern-surface and at the ends thereof stop-faces limiting the movement of the turret longitudinally of the spindles by engaging said stop, and means for imparting motion to the turret laterally and longitudinally of the spindle, substantially as described.

33. In a turning-machine, the combination with the hollow spindle having a shoulder, and with the sliding chuck within the spindle, of the sliding sleeve on the spindle and connected at one end thereof with said chuck to actuate the same, the spring within the sleeve and bearing against the shoulder on the spindle, and the tubular adjusting-screw on the spindle and carried within the end of the sleeve opposite to the connection between the sleeve and chuck, substantially as described.

34. In a turning machine, the combination with the spindle having the enlarged portion 115 and the slot therein, of a chuck fitted to slide within said spindle, the sliding sleeve 114 connected with the chuck through said slot, the adjusting-screw fixable in said sleeve, and a spring acting between said enlarged portion 115 and said screw, whereby the force of the spring may be adjusted for regulating the closing of the chuck, substantially as described.

35. In a turning machine, the combination with the spindle and its chuck, of the sliding collar operatively connected with the chuck, a sliding shaft having an arm engaging said collar to open the chuck, and a treadle-cam substantially as described constructed and arranged to actuate said shaft, substantially as described.

36. In a turning machine, the combination with the spindle and its chuck, of the sliding collar operatively connected with the chuck for opening the same, the sliding shaft 155, the arm 156 fixable on said shaft and engaging said collar, the shaft-actuating cam revolubly supported substantially as described, and means for actuating said cam, substantially as described.

37. In a turning-machine, the combination with the hollow spindle and its driving-band and the chuck in said spindle, and with the sliding collar on the spindle connected with the chuck for actuating the same, of the fixed and loose band-pulleys on the spindle, the band-shifter engaging the band for shifting the same from one pulley to the other, the sliding shaft connected with said collar for actuating the chuck, and a shaft-actuator, substantially as described, engaging said sliding shaft and said band-shifter, whereby the band is shifted from the fixed pulley to the loose pulley on the opening of the chuck, substantially as set forth.

38. In a turning machine, the combination with the spindle and its chuck, of the sliding collar operatively connected with the chuck to open the same, the sliding shaft 155, the clutch-actuating arm on said shaft and engaging said collar, a treadle-cam substantially as described actuating the shaft to open the chuck, a spring reversely actuating the shaft to retract the clutch-actuating arm, a belt-shifter, and a cam connected with the treadle-cam and constructed to operate the shifter on the opening of the chuck, substantially as described.

FRANCIS H. RICHARDS.

Witnesses:
HENRY L. RECKARD,
HANS MALLNER.